UNITED STATES PATENT OFFICE.

JEAN EFFRONT, OF BRUSSELS, BELGIUM.

RECOVERY OF AMMONIA FROM DISTILLERS' WASHES.

No. 868,976.　　　Specification of Letters Patent.　　　Patented Oct. 22, 1907

Application filed December 13, 1906. Serial No. 347,613.

*To all whom it may concern:*

Be it known that I, JEAN EFFRONT, doctor, a subject of the Russian Emperor, and residing at Brussels, in the Kingdom of Belgium, have invented a new and useful Recovery of Ammonia from Distillers' Washes; and I do hereby declare the following to be a full, clear, and exact description of the same.

Heretofore concentrated distillers washes have (with or without addition of lime) been distilled directly for the purpose of recovering the nitrogen in the form of ammonia. Such distillations have been without practical results, because only a very small quantity of nitrogen is extracted; moreover the product thus obtained by distillation contains large quantities of ammonia in combination with other materials and which cannot be easily utilized. These objections are due to the complex composition of the nitrogenous substances contained in the washes. In fact, they are in the state of amins, amids and amido acids, as well as in the state of albuminoid substances, and large quantities thereof are combined with alkaline bases. The resistances of these different combinations to the action of heat being different, their transformation into ammonia by a single operation is difficult and incomplete.

My present invention has for its object to provide an improved method of converting the nitrogenous substances of the distillers washes into ammonia, and consists in carrying out the distillation in two successive operations, the first employing an acid medium, and the second employing a neutral medium.

By distilling in an acid medium, at a temperature of about 30° or 200° C., nitrogenous substances combined with alkaline bases will be set free in the state of ammonia which produces with the volatile acids of the washes, ammoniacal compounds (volatile at 180°—200° C.) and is carried away by a current of superheated air. By this treatment, the distillers washes lose about 15 to 70% of their nitrogen. After this first distillation, there remains a nitrogenous residue (containing the remaining 50 to 30% of nitrogen), which has a coal-like appearance. When this residue is calcined in presence of acid, the nitrogenous substances of the residue are converted into nitrogen, cyanids and a small quantity of ammonia. On the other hand, the calcination in neutral medium, in the presence of superheated air, results in the extraction of nearly the whole quantity of remaining nitrogen in the state of ammonia. By these two successive distillations when carefully carried out, 98% of the total quantity of nitrogen will be recovered from distillers washes in the state of ammonia.

For acidifying the washes, with a view to removing the nitrogenous substances in the first distillation, above described, I use acid salts such as bisulfate, superphosphate and the like or mineral acids. However, for these acid salts or acids, I may substitute resins which, owing to their acid character, produce the same effect as acid salts. In fact, the alkaline bases, such as potash and soda, are combined in distiller's washes with amido acids, and when resin (colophony) which is composed of a large quantity of abietic acid (not volatile at 200° C.) is added thereto, said bases will be combined with this abietic acid to form soap (fixed at 200° C.), while the amido acids are set free and converted into ammonia. Therefore, colophony acts in this reaction like mineral acids or acid salts.

I preferably substitute resins for mineral acids or acid salts, because these acids or acid salts form sulfates or chlorids of soda or potash, the commercial value of which is inferior to that of carbonate of potash or soda easily obtained by using resins and decomposing the resinous alkaline soap formed by combination of resin with alkaline bases.

The method is realized differently according to the washes to be treated. For treating washes of corn, I preferably use bisulfate of soda. For treating washes of molasses or beets, I preferably use resin (colophony) which forms soap with the bases combined with the nitric substances, and said soap may be easily converted to carbonate.

The quantity of acid to be used must be chosen according to the proportion of alkaline substances contained in the washes. Practically, for determining this quantity of acid, by means of preliminary experiments on the washes to be treated, I preferably proceed as follows: In each of a series of glass receptacles I place 100 grams of washes to be treated, and different and determined quantities of acid or acid salts. These receptacles are placed in a stove and heated for 5 hours, to a temperature of 190° C., superheated air being passed through each receptacle. Thereafter the acidity of the washes contained in each receptacle is ascertained: The quantity of acid or acid salt to be used for carrying the method corresponds to that which has been placed into the receptacle, the washes of which contain, after the said operation 2 to 4 grams of acid (sulfuric acid) per 100 grams of substances. In one form, this present method or process is carried out as follows:—The washes are concentrated to 40° or 42° Baumé. Then I add thereto the quantity of acid or acid salt (varying for instance from 10 to 30 kgrs. of bisulfate for 1000 kgrs. of concentrated washes) determined by the preliminary experiment, above described, and the mixture is dried. For this purpose the liquid is maintained heated at 180° or 200° C. This operation is preferably carried on in a stove through which a current of superheated air is passed, and the products of distillation are collected into washers. The heating of the washes within the stove is continued until they have lost about one half of their weight. The liquid which is distilled during the drying operation has, at a given moment, an acid action and contains ammonia in the state of salts. The quantity of ammonia thus obtained is about 50% of the total quantity of nitrogen contained in the washes treated, but may reach 60% and even 75%.

The residue remaining in the stove is a melted porous mass containing all the saline and nitric organic substances. In order to extract the nitrogen from this residue, I crush the porous mass and add sufficient carbonate of lime for its neutralization, and I then place the mixture into iron retorts, arranged within a furnace and heated to the temperature of 700° C. During the heating, a current of superheated steam and air is passed through the mass, and the distilled products are collected into acid condensators. Among the products of distillation is methylic alcohol which, in certain cases, may be extracted for other purposes.

The two distinct operations, characteristic of the improved process herein described (the drying operation—desiccation—and the distillation of the dried mass) relate especially to distillers washes treated with acid salts or mineral acids.

When the process is carried on with abietic acid (colophony) I preferably proceed as follows:—100 kgrs. of concentrated washes are mixed with 20 to 30 kgrs. of pulverized abietic acid, and heated in a stove to a temperature of about 200° C. during 3 or 4 hours. During this time, currents of superheated air and carbonic gas are caused to pass alternately through the stove. The distilled liquid is collected in acid. The remaining mass composed of resinous soap, resin and organic substances, after being dried, is treated with hot water. The resin floating on the surface is then decanted and the liquid filtered through linen. The material retained on the filter is treated with lime in order to decompose the resinous soap, and the resin thus liberated is again collected, after which a nitric substance, which is insoluble in water, remains on the filter. This substance is first dried in the stove at a temperature of 100° C., and then treated as above described in retorts, heated to a temperature of 700° C. by means of superheated steam and air.

In treating certain molasses it may be advantageous to remove the salt from the mass which has been maintained at a temperature of 180° C. This separation may be effected easily as the nitrogen is in an insoluble state: All then necessary is to dissolve the salts in hot water for separating therefrom the nitric substance, which is utilized afterwards.

Having thus fully described my invention, what I claim and desire to secure by Letters Patent is:—

1. The process of utilizing distiller's washes, which consists in decomposing the alkaline organic substances contained in concentrated washes; then distilling at a low temperature, and collecting the products of distillation; neutralizing the dried residue and heating it to a temperature of 700° C., and, during such heating, subjecting the mass to the action of superheated steam and air, and collecting the products of distillation.

2. The process of utilizing distiller's washes, which consists in decomposing the alkaline organic substances contained in concentrated washes; then distilling, in the presence of dry air superheated to 170° C., and collecting the products of distillation; neutralizing the dried residue and heating it to a temperature of 700° C., whereby a part of the ammonia is driven off, and,—durding such heating, subjecting the mass to the action of superheated steam and air, and collecting the products of distillation.

3. The process of utilizing distiller's washes, which consists in treating concentrated washes with material of an acid character for decomposing the alkaline organic substance contained in said washes; distilling at a low temperature, and collecting the products of distillation; neutralizing the dried residue and heating it while subjecting the mass to the action of superheated steam and air, and collecting the products of distillation.

In testimony whereof, I have signed my name to this specification in the presence of two subscribing witnesses.

JEAN EFFRONT.

Witnesses:
R. SANDHOE,
GREGORY PHELAN.